United States Patent [19]

Tsuyuki

[11] Patent Number: 4,796,787

[45] Date of Patent: Jan. 10, 1989

[54] APPARATUS FOR PRECISELY MEASURING AND SUPPLYING LIQUID

[75] Inventor: Isao Tsuyuki, Kanagawa, Japan

[73] Assignee: Fuji Photo Film Co., Ltd., Kanagawa, Japan

[21] Appl. No.: 914,401

[22] Filed: Oct. 2, 1986

[30] Foreign Application Priority Data

Oct. 2, 1985 [JP] Japan .................................. 219986

[51] Int. Cl.⁴ .............................................. B67D 5/08
[52] U.S. Cl. ...................................... 222/64; 222/108; 222/130; 222/319; 222/333; 222/405; 137/121; 141/196; 141/198; 141/245; 417/435
[58] Field of Search .................... 222/52, 63, 64, 56, 222/108, 130, 319, 330, 333, 386, 387, 390, 405, 596; 417/435; 141/192, 196, 198, 245, 206, 59, 60, 44, 55, 54; 137/120–122

[56] References Cited

U.S. PATENT DOCUMENTS 4,274,552  6/1981  Proni ................................. 222/64 X
4,602,662  7/1986  Eremity et al. .................... 141/198

FOREIGN PATENT DOCUMENTS 1946629   3/1971  Fed. Rep. of Germany .
32990    10/1970  Japan .
199560   12/1982  Japan .

OTHER PUBLICATIONS

Formichelli, J. C., "Paste Dispenser", IBM Technical Disclosure Bulletin, vol. 16, No. 7, Dec. 1973.

Primary Examiner—Joseph J. Rolla
Assistant Examiner—David H. Bollinger
Attorney, Agent, or Firm—Sughrue, Mion, Zinn, Macpeak & Seas

[57] ABSTRACT

An apparatus for supplying an accurately measured volume of liquid, comprising a vessel filled with the liquid, a cylinder loosely and slidably fitted into the vessel from above, and a sealing box at the top of the vessel sealing the vertical motion of the cylinder. The sealing box has a liquid discharge port at a bottom edge. A drive shaft, preferably screw driven, moves the cylinder vertically downward.

2 Claims, 2 Drawing Sheets

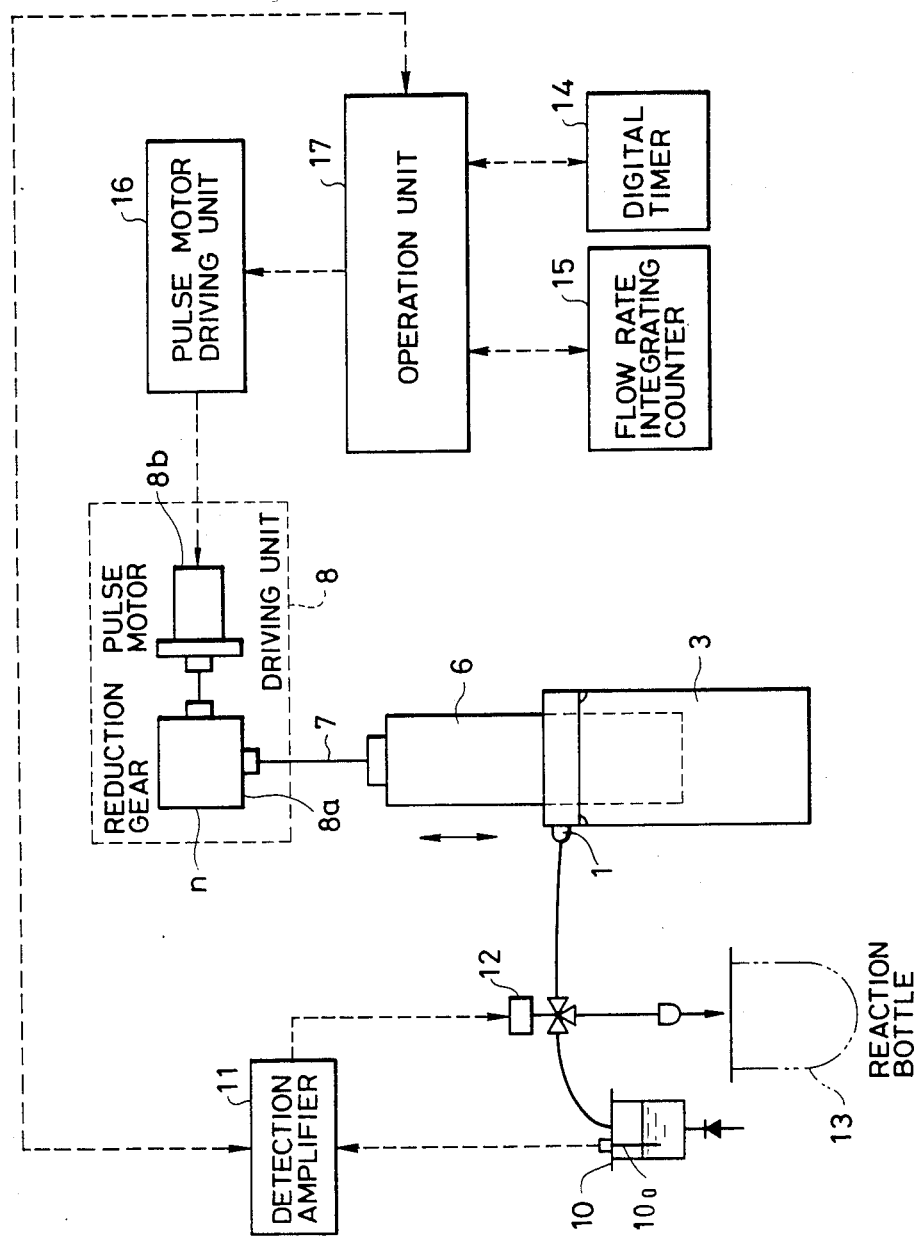

APPARATUS FOR PRECISELY MEASURING AND SUPPLYING LIQUID

BACKGROUND OF THE INVENTION

1. Field of the Invention

The present invention generally relates to an apparatus for precisely measuring and supplying liquid used in the field of manufacturing chemicals and medicines. More particularly, it relates to an apparatus for precisely measuring and supplying liquid suitably used in investigations, experiments, or the like, for feeding a small or an intermediate quantity of liquid in increments of a very small quantity.

2. Background Art

An apparatus for precisely measuring and feeding a small or an itermediate quantity of liquid by increments of a predetermined very small quantity for a relatively long time is conventional and widely used. One such apparatus is an apparatus in which a small quantity of liquid is supplied into a head tank through a metering pump and sent by liquid pressure due to a substantially fixed height of the liquid in the tank. Another apparatus fills a tank up with liquid and a predetermined gas pressure is applied to the liquid so as to feed the liquid. In a further apparatus, an injector of the syringe type constituted by a precisely produced set of a cylinder and a piston is filled up with liquid and the liquid is pushed out of the injector by power of a motor driven at a predetermined rotational speed. (For example, disclosure is made in Japanese Utility Model Unexamined Publication No. 121266/76).

In the apparatus using a head tank, however, there has been such a disadvantage that a quantity of liquid to be supplied fluctuates up and down because it is difficult to keep the level of the liquid constant. In the apparatus in which liquid in a head tank is pressurized by a gas, on the other hand, there has been such a disadvantage that as the liquid filling the tank decreases as it is sent out, the whole head pressure decreases to thereby decrease the quantity of liquid to be fed. As a result, it is difficult to limit the fluctuation in flow rate of the liquid so as not to be larger than 2% in the time between the initiation and the completion of supplying the liquid. Therefore, there is large scattering in time of ending the addition of liquid. Further, in the above-mentioned apparatus, there has been such a disadvantage that it is difficult to desirably accurately perform the temporary change in quantity of liquid to be supplied. Moreover, in performing automatic flow rate control in the foregoing apparatus, there has been the disadvantage that it is impossible to precisely and accurately perform detection and measurement of a flow rate of liquid and the control of the flow rate is complicated because the flow rate is very small. Although it is suitable for supplying a very small quantity of liquid, the apparatus which supplies liquid by a fixed quantity by using a motor-driven injector of the syringe-type cylinder and a piston has the following disadvantages. Not only is the accuracy in flow rate reduced as the quantity of liquid to be treated is increased to an intermediate quantity but also it is difficult to maintain the smoothness of cylinder surface or piston surface, the equipment increases in weight, the washing required for the equipment becomes extensive, and the cost of the equipment becomes high.

Recently, in various processing steps in the field of manufacturing chemicals and medicines, such as reaction, dissolution, application, and filling, particularly in the processing accompanying reaction, it has been desired to perform the addition of liquid medicine with an accurate flow rate and to make the flow rate arbitrarily changeable since the respective processing steps have been made precise and complicated. It has been further desired to improve the performance of an apparatus for precisely measuring and supplying a very small quantity of liquid.

SUMMARY OF THE INVENTION

An object of the present invention is therefore to eliminate the foregoing disadvantages in the prior art.

Another object of the present invention is to provide, in response to long desired demands, an apparatus for precisely measuring and supplying liquid, in which a small or an intermediate quantity of liquid, even a very small quantity of liquid, can be precisely measured and supplied for a relatively long time and the flow rate of the liquid can be desirably changed.

According to the present invention, the apparatus for precisely measuring and supplying liquid comprises a vessel to be filled up with liquid, a cylinder to be loosely fittingly pushed into the vessel through a sealing box having a liquid discharge port at its lower portion, and a driving unit for driving the cylinder to be sent into the vessel through a power transmission shaft.

BRIEF DESCRIPTION OF THE PREFERRED EMBODIMENTS

FIG. 2 is a diagram showing the use of an embodiment of the liquid precisely measuring and supplying apparatus according to the present invention when utilized for a reactor.

DETAILED DESCRIPTION OF THE PREFERRED EMBODIMENTS

Figure 1:
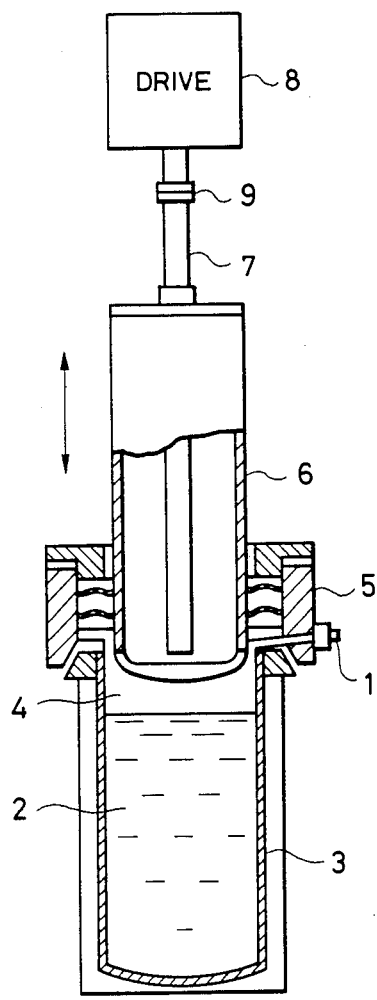
FIG. 1 is a diagram showing the whole arrangement of an embodiment of the precise liquid measuring and supplying apparatus according to the present invention.

FIG. 1 is a diagram showing the entire arrangement of the precise liquid measuring and supplying apparatus according to the present invention. In the drawing, the apparatus includes a vessel 3 filled up with liquid 2. A cylinder 6 is pushed to be loosely fitted in the vessel 3 through a sealing box 5 having a liquid discharge port 1 at its lower portion. The sealing box 5 provides an airtight seal with the cylinder 6. A driving unit 8 drives the cylinder 6 through a power transmission shaft 7 in order to move the cylinder 6 into the vessel 3.

The vessel 3 is not required to have high accuracy in its inner diameter like a cylinder of the syringe type, and is provided with a temperature adjusting jacket according to need. The vessel 3 is fastened at its upper portion to the sealing box 5 so as to maintain airtightness when the cylinder 6 is pushed into the vessel 3.

The cylinder 6 is finished precisely so as to have an outer diameter which is uniform over its entire length and formed so as to be pushed vertically into the upper part of the vessel 3.

It is preferable that the power transmission shaft 7 be formed as a screw shaft having a feed screw portion formed on its outer surface. However, the power transmission shaft 7 may be of any type so long as it may be caused by the driving unit 8 to move the cylinder 6 into the vessel 3. The thickness of the shaft and the pitch of the screw are selected during designing in accordance with the required measuring accuracy.

It is important for the driving unit 8 to give the power transmission shaft 7 a movement for performing accurate running and stopping, the driving unit 8 being constituted by a reduction gear and a motor which may preferably be a pulse motor, a DC servo motor, or an AC servo motor.

According to the present invention, liquid in the vessel 3 is discharged from the vessel 3 through the liquid discharge port 1 by a quantity corresponding to a volume of a portion of the cylinder 6 pushed into the vessel 3. A flow rate of the liquid per unit time is determined corresponding to the movement speed of the cylinder 6 into the vessel 3. Therefore, the fact that the cylinder 6 is finished precisely so as to have an outer diameter which is uniform over its entire length and formed so as to be pushed vertically into the upper part of the vessel 3 may provide high volume accuracy, that is, high accuracy in the quantity of liquid to be supplied. The insertion speed of the cylinder 6 into the vessel 3 depends on the operations of the power transmission shaft 7 and the driving unit 8. The diameter of the cylinder 6 and the pitch of the power transmission screw shaft 7 represent the possibility of accuracy of adjustment. As a result, the liquid supply speed can be adjusted precisely by the operation of accurate and precise running and stopping of the pulse motor, the DC servo motor, or the AC servo motor.

FIG. 2 is a diagram showing the use of an embodiment in which the precise liquid measuring and supplying apparatus according to the present invention is used for supplying liquid to a reactor vessel.

The vessel 3 has a capacity of 10 liters of liquid medicine. The cylinder 6 arranged to be pushed into the vessel 3 by the force of the driving unit 8 which is composed of a reduction gear 8a and a pulse motor 8b which transmit torque to the power transmission screw shaft 7 so as to initially push air on the surface of the liquid medicine in the vessel 3 out of the vessel 3. The air is discharged into an air extractor 10 through the liquid discharge port 1. Thereafter, a small quantity of the liquid medicine in the vessel 3 is also discharged into the air extractor 10 when the air has been completely discharged out of the vessel 3. Upon detection of liquid medicine in the air extractor 10 by a liquid detector 10a, a detection amplifier 11 actuates a cross valve 12 to change the path so that the liquid medicine from the liquid discharge port 1 can be supplied to a reaction bottle 13, completing the preparation for measuring the addition flow. The liquid detector 10a may be of any of the well known types. One such type is the two electrode level detector disclosed by Takeda in Japanese Published Application No. 199560/1982.

An operation unit 17 performs sequence control for a reaction process, program control for flow rate setting, and setting of conditions of liquid medicine addition to the reactor and it includes a pulse controller. The operation unit 17 is connected to a digital timer 14, and a flow rate integrating counter 15. Upon initiation of an addition operation, a pulse motor driving unit 16 controls driving of the pulse motor 8b in accordance with an instruction from the operation unit 17 so that the cylinder 6 is pushed into the vessel 3 by the power transmission screw shaft 7 in accordance with a controlled sequence. This controlled sequence includes fixed speed movement, speed changing, and stopping, to thereby perform precise measurement and supply of the liquid medicine from the liquid discharge port 1 into the reaction bottle 13.

In the liquid measuring and supplying apparatus according to the present invention, it was possible to change a flow rate within a range of addition quantity of 3-3000 milliliter/min for a relatively long time (1-3 hours), and the measurement accuracy was 0.05-0.1 milliliter/min. Further it is possible to relatively easily produce an apparatus, particularly, the vessel 3, in the foregoing precise liquid measuring and supplying apparatus to be used for the addition of liquid in the reaction process. Therefore, it was possible to use a precise liquid measuring and supplying apparatus having a capacity of 20 milliliter-100 liter.

As described above, in the liquid precisely measuring and supplying apparatus according to the present invention, it is possible to precisely measure and supply a small to an intermediate quantity of liquid, and even a very small quantity of liquid, for a relatively long time, and to desirably change the flow rate of the liquid, so that it is possible to improve the accuracy in experiments and/or investigations. Further, the measuring and supplying apparatus according to the present invention not only can contribute to a new reaction operation and development of investigation and exploitation of new products but can be used as an apparatus for manufacturing photographic emulsions.

I claim:

1. An apparatus for supplying a liquid, comprising:
   a vessel;
   a sealing box sealable to an upper side of said vessel and having a liquid discharge port at a lower portion of said sealing box, said vessel being at least partially filled with a liquid at a lower portion of said sealing box;
   a cylinder loosely and airtightly pushable downward into said vessel through said sealing box;
   a driving unit for driving through a power transmission shaft said cylinder to be pushed into said vessel by a predetermined distance and at a predetermined speed, whereby a correspondingly predetermined amount of said liquid is pushed through said discharge port at a correspondingly predetermined flow rate;
   a cross valve coupled to said liquid discharge port;
   a receiving vessel coupled to said cross valve;
   an air extractor coupled to said cross valve;
   a liquid detector in said air extractor; and
   a control circuit for coupling said liquid discharge port through said cross valve alternatively to said receiving vessel or to said air extractor in response to a signal from said liquid detector.

2. An apparatus according to claim 1, wherein said power transmission shaft is a screw shaft and said driving unit comprises a reduction gear and a pulse motor.

* * * * *